United States Patent
Doi et al.

(10) Patent No.: US 12,384,265 B2
(45) Date of Patent: Aug. 12, 2025

(54) POWER SUPPLY UNIT

(71) Applicant: TOYOTA JIDOSHA KABUSHIKI KAISHA, Aichi-ken (JP)

(72) Inventors: Taiga Doi, Okazaki (JP); Kenji Murasato, Toyota (JP); Daisuke Kamikihara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 590 days.

(21) Appl. No.: 17/841,671

(22) Filed: Jun. 16, 2022

(65) Prior Publication Data

US 2022/0402391 A1 Dec. 22, 2022

(30) Foreign Application Priority Data

Jun. 18, 2021 (JP) ................................. 2021-101468

(51) Int. Cl.
*B60L 53/22* (2019.01)

(52) U.S. Cl.
CPC ........... *B60L 53/22* (2019.02); *B60L 2210/10* (2013.01); *B60L 2240/525* (2013.01)

(58) Field of Classification Search
CPC .............. B60L 53/22; B60L 2210/10; B60L 2240/525; B60L 15/007; B60L 7/16; B60L 1/00; B60L 53/14; B60L 2210/30; Y02T 10/70; Y02T 10/7072; Y02T 90/14; H02M 1/00; H02M 1/0003; H02M 1/0038; H02J 7/00309; H02J 7/0042; H02J 7/0063; H02J 7/0068; H02J 7/02; H02J 2207/20

USPC ................................................... 320/140, 109
See application file for complete search history.

(56) References Cited

U.S. PATENT DOCUMENTS

| | | | | |
|---|---|---|---|---|
| 2004/0244397 A1* | 12/2004 | Kim | ......................... | G06F 1/203 |
| | | | | 62/259.2 |
| 2009/0162018 A1* | 6/2009 | Hayase | .................. | G02B 6/421 |
| | | | | 385/94 |
| 2014/0076526 A1* | 3/2014 | Sakai | ......................... | F28F 7/02 |
| | | | | 165/175 |
| 2015/0029666 A1 | 1/2015 | Kosuga et al. | | |
| 2020/0119655 A1* | 4/2020 | Ichinose | .................. | B60L 50/66 |

FOREIGN PATENT DOCUMENTS

| | | |
|---|---|---|
| EP | 1266801 A2 | 12/2002 |
| EP | 2634035 A1 | 9/2013 |
| JP | 2013-211943 A | 10/2013 |
| JP | 2014-230417 A | 12/2014 |

* cited by examiner

Primary Examiner — Paul Dinh
(74) Attorney, Agent, or Firm — HAUPTMAN HAM, LLP

(57) ABSTRACT

A power supply unit accommodates a main DC/DC converter and an AC charger (a charging circuit, a sub-DC/DC converter) in a housing. The main DC/DC converter and the sub-DC/DC converter are arranged in the same tier of the housing. The charging circuit is arranged in a tier different from that of the main DC/DC converter and the sub-DC/DC converter. The main DC/DC converter and the sub-DC/DC converter arranged in the same tier of the housing are controlled to operate in a mutually exclusive manner.

4 Claims, 5 Drawing Sheets

(TRAVELING)

(AC CHARGING)
(POWER CONSUMPTION Pa OF LOW-VOLTAGE AUXILIARY DEVICE < THRESHOLD Pth)

⟨AC CHARGING⟩
(POWER CONSUMPTION Pa OF LOW-VOLTAGE AUXILIARY DEVICE ≥ THRESHOLD Pth)

⟨DC CHARGING⟩

FIG.7

|  | DURING TRAVELING | AC CHARGING ($Pa < Pth$) | AC CHARGING ($Pa \geq Pth$) | DC CHARGING |
|---|---|---|---|---|
| CHARGING CIRCUIT (AC CHARGER) | STOPPED | OPERATED | OPERATED | STOPPED |
| SUB-DCDC (AC CHARGER) | STOPPED | OPERATED | STOPPED | STOPPED |
| MAIN DCDC | OPERATED | STOPPED | OPERATED | OPERATED |

POWER SUPPLY UNIT

This nonprovisional application is based on Japanese Patent Application No. 2021-101468 filed on Jun. 18, 2021 with the Japan Patent Office, the entire contents of which are hereby incorporated by reference.

BACKGROUND

Field

The present disclosure relates to a power supply unit.

Description of the Background Art

Japanese Patent Laying-Open No. 2014-230417 discloses a power converter that accommodates electronic components in a housing. In the housing, a pedestal is arranged that has a plurality of through-holes for flowing refrigerant that cools the electronic components. The electronic components are arranged on different surfaces of the pedestal in this power converter, leading to an increased area for effectively cooling the electronic components.

SUMMARY

Electric-powered vehicles, such as battery electric vehicles and plug-in hybrid electric vehicles, are desired to include smaller-sized in-vehicle devices to have a smaller mounting space (save space) for a wider interior space or the like.

Power converters, such as an AC (alternating current) charger that converts AC power supplied from an AC power supply external to the vehicle into DC (direct current) power for charging a traveling battery, a main DC/DC converter that converts the DC power of the traveling battery into a driving voltage of an auxiliary device, and a sub-DC/DC converter that converts the AC power supplied from the AC power supply to the driving voltage of the auxiliary device, may be mounted on the electric-powered vehicle. In one conceivable example, functions of vehicle-mounted devices including such power converters are integrated into a unit to save space more than when the vehicle-mounted devices are arranged individually.

In the integration of the functions into a unit, however, the vehicle-mounted devices are accommodated in the same housing, and accordingly, a problem associated with the heat generated in each vehicle-mounted device may become significant. In particular, in a case where power converters that may generate a larger amount of heat are arranged adjacent to each other, the risk of failure may increase due to thermal interference between the power converters.

The present disclosure has been made to solve the above problem. An object of the present disclosure is to reduce thermal interference between power converters while reducing a size of a power conversion unit in which the functions of the power converters are integrated.

(1) A power conversion unit according to the present disclosure includes a first power converter, a second power converter, a controller that controls the first power converter and the second power converter, and a housing that has a plurality of accommodation spaces defined by a partition wall and accommodates the first power converter, the second power converter, and the controller. The first power converter and the second power converter are arranged in the same accommodation space of the housing. The controller operates the first power converter and the second power converter in a mutually exclusive manner.

With the above configuration, the first power converter and the second power converter arranged in the same accommodation space of the housing are operated in a mutually exclusive manner. In other words, when any one of the first power converter and the second power converter operates, the other is stopped. As a result, the amount of heat generated by the first power converter and the second power converter can be reduced more than when both the first power converter and the second power converter operate. Thermal interference between the power converters can thus be reduced while reducing a size by unitization.

(2) In one embodiment, the partition wall has a refrigerant passage through which refrigerant flows.

With the above configuration, the refrigerant passage of the partition wall reduces heal generation of the first power converter and the second power converter.

(3) In one embodiment, the power supply unit is mounted on a vehicle configured to perform AC charging of charging a main battery mounted on the vehicle with AC power supplied from an AC power supply external to the vehicle. The first power converter converts electric power of the main battery into electric power to be supplied to an auxiliary device mounted on the vehicle. The second power converter converts electric power supplied from the AC power supply into electric power to be supplied to the auxiliary device.

Considering the ease of mounting on the vehicle, it is desirable to reduce an increase in the height of the power supply unit. The first power converter and the second power converter can supply electric power to the auxiliary device by operating at least one of the power converters, and accordingly, can operate in a mutually exclusive manner. An increase in the height of the power supply unit can be reduced arranging, in the same accommodation space, the first power converter and the second power converter that can operate in a mutually exclusive manner.

(4) In one embodiment, the power supply unit further includes a third power converter that converts the AC power into electric power for charging the main battery. The third power converter is arranged in an accommodation space different from that of the first power converter and the second power converter.

The first power converter and the second power converter can be operated simultaneously with the third power converter. For example, when electric power of the main battery is supplied to the auxiliary device of the vehicle in execution of AC charging, the third power converter is operated to charge the main battery, and the first power converter is operated to convert electric power of the main battery, and then, the converted electric power is supplied to the auxiliary device. For example, when AC power is supplied to the auxiliary device of the vehicle in execution of AC charging, the third power converter is operated to charge the main battery, and the second power converter is operated to convert AC power, and then, the converted electric power is supplied to the auxiliary device. Thermal interference between the power converters can be reduced by arranging the third power converter that can be operated simultaneously with the first power converter and the second power converter in the accommodation space different from that of the first power converter and the second power converter.

(5) In one embodiment, the controller controls the third power converter. The second power converter has a power capacity lower than a power capacity of the first power converter. In execution of AC charging, when power consumption of the auxiliary device is smaller than a threshold, the controller operates the third power converter to charge the main battery, operates the second power converter to supply electric power to the auxiliary device, and stops the first power converter.

(6), (7) In one embodiment, the controller controls the third power converter. The second power converter has a power capacity lower than a power capacity of the first power converter. In execution of the AC charging, when power consumption of the auxiliary device is greater than a threshold, the controller operates the third power converter to charge the main battery, operates the first power converter to supply electric power to the auxiliary device, and stops the second power converter.

With the configuration of each of (5) to (7) above, the controller determines which of the first power converter and the second power converter is to be operated and which of these power converters is to be stopped, depending on whether power consumption of the auxiliary device is greater than the threshold. The threshold is determined, for example, based on the power capacity of the second power converter. The power consumption of the second power converter is generally smaller than the power consumption of the first power converter. Considering power conversion efficiency, thus, when the amount of electric power supplied from the second power converter can cover the power consumption of the auxiliary device, operating the second power converter is more desirable than operating the first power converter. When the power consumption of the auxiliary device is smaller than the power capacity of the second power converter, power conversion efficiency can be increased more by operating the second power converter to supply electric power to the auxiliary device than operating the first power converter to supply electric power to the auxiliary device.

(8) In one embodiment, the vehicle is configured to perform DC charging of charging the main battery with DC power supplied from a DC power supply external to the vehicle. The power supply unit further includes a relay for supplying the DC power to the main battery. The relay is accommodated in an accommodation space different from the accommodation space of the first power converter and the second power converter and an accommodation space of a third power converter.

With the above configuration, the relay is accommodated in an accommodation space different from the accommodation spaces of the first to third power converters. Accordingly, thermal interference with the relay by the first to third power converters can be reduced.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 shows operation states of a main DC/DC converter, a charging circuit, and a sub-DC/DC converter.

DESCRIPTION OF THE PREFERRED EMBODIMENTS

Figure 1:
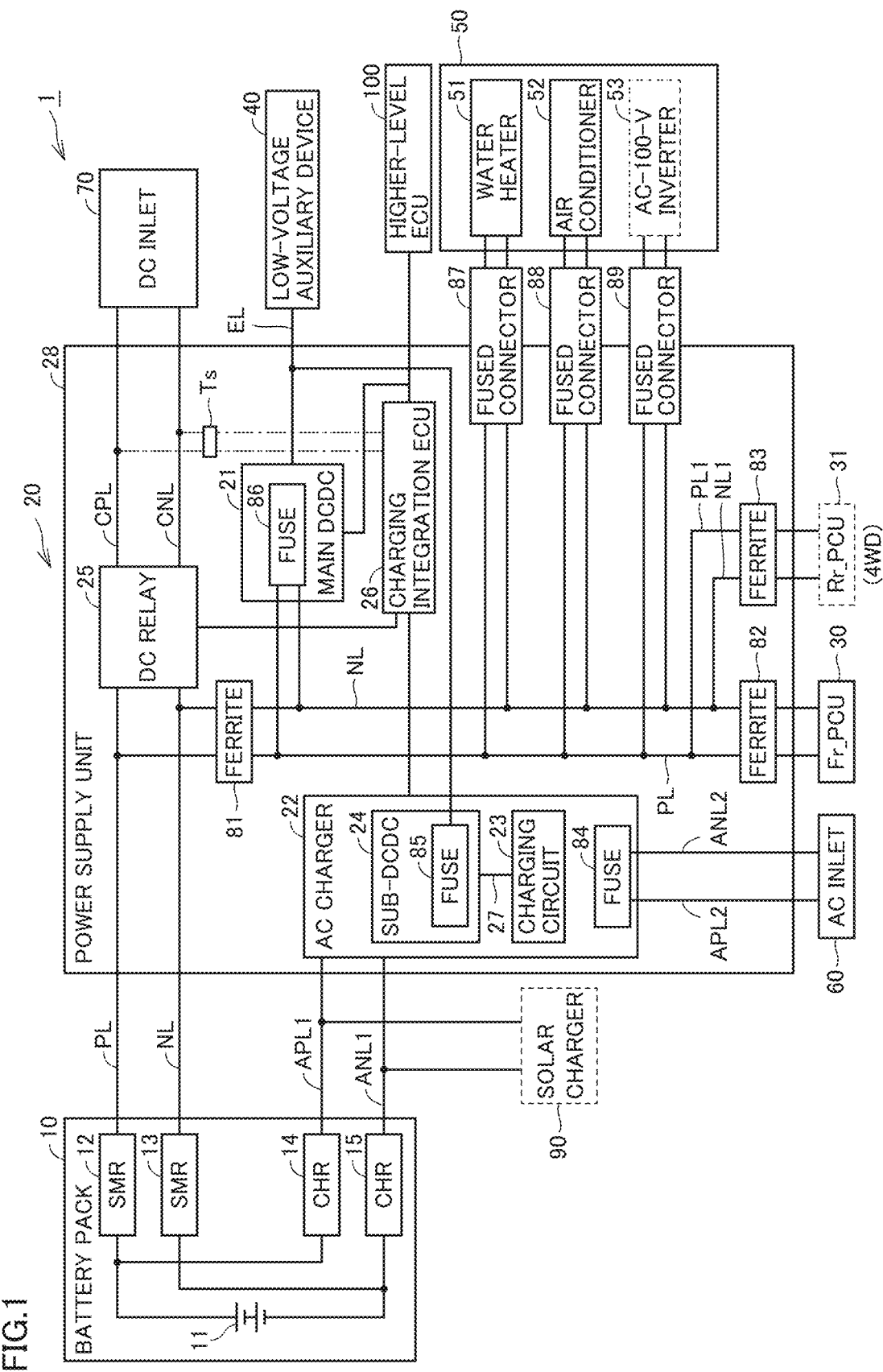
FIG. 1 is a block diagram showing an example configuration of a vehicle according to an embodiment.

An embodiment of the present disclosure will be described below in detail with reference to the drawings. The same or corresponding elements in the drawings have the same reference characters allotted in the figures, description of which will not be repeated.

Overall Configuration

FIG. 1 is a block diagram of an example configuration of a vehicle 1 according to the present embodiment. Vehicle 1 according to Embodiment 1 is a battery electric vehicle. It suffices that vehicle 1 can perform external charging of receiving electric power supplied from an external power supply external to vehicle 1 and performing charging a vehicle-mounted main battery, and vehicle 1 is not limited to a battery electric vehicle. Vehicle 1 may be, for example, a plug-in hybrid electric vehicle or a fuel cell electric vehicle.

Vehicle 1 according to the present embodiment is configured to perform AC charging of receiving AC power supplied from an AC power supply external to vehicle 1 and charging the vehicle-mounted main battery and perform DC charging of receiving DC power supplied from a DC power supply external to vehicle 1 and charging the vehicle-mounted main battery.

Vehicle 1 includes a battery pack 10, a power supply unit 20, a front power control unit (hereinafter also referred to as "Fr_PCU" 30), a low-voltage auxiliary device 40, a high-voltage auxiliary device 50, an AC inlet 60, a DC inlet 70, and a higher-level ECU (Electronic Control Unit) 100. Although vehicle 1 according to the present embodiment is configured to drive front wheels, when vehicle 1 is configured to drive all wheels, vehicle 1 further includes a rear power control unit (hereinafter also referred to as "Rr_PCU" 31).

Battery pack 10 is mounted on vehicle 1 as a driving power supply (i.e., power source) of vehicle 1. Battery pack 10 includes a main battery 11, system main relays (hereinafter also referred to as "SMRs") 12, 13, and charging relays (hereinafter also referred to as "CHRs") 14, 15.

Main battery 11 is formed of a stack of a plurality of batteries. The battery is, for example, a secondary battery such as a nickel metal hydride battery or a lithium ion battery. The battery may be a battery having a liquid electrolyte between a positive electrode and a negative electrode, or may be a battery having a solid electrolyte (all-solid-state battery). It suffices that main battery 11 is any rechargeable DC power supply, and a large-capacitance capacitor can also be used.

SMRs 12, 13 are electrically connected between main battery 11 and power lines PL, NL, respectively. SMR 12 has one end electrically connected to a positive terminal of main battery 11 and the other end electrically connected to power line PL. SMR 13 has one end electrically connected to a negative terminal of main battery 11 and the other end electrically connected to power line NL. SMRs 12, 13 switch between open/close states, for example, in accordance with a control signal from higher-level ECU 100.

Power lines PL, NL electrically connect battery pack 10 to Fr_PCU 30. Power lines PL, NL are partially accommodated in power supply unit 20. Power lines PL, NL are equipped with antinoise ferrite cores 81, 82. When an Rr_PCU 31 is provided, power lines PL, NL are branched into power lines PL1, NL1, respectively. Power lines PL1, NL1 are electrically connected to Rr_PCU 31. Power lines PL1, NL1 are equipped with a ferrite core 83. Each of ferrite cores 81 to 83 captures a magnetic field generated by a high-frequency noise current and converts the captured magnetic field into heat, thereby reducing noise. Ferrite cores 81 to 83 are each accommodated in power supply unit 20.

Fr_PCU 30 converts DC power supplied from main battery 11 through power lines PL, NL into AC power and supplies the AC power to a motor generator (not shown). The motor generator is an AC rotating electric machine and is, for example, a permanent-magnet-type synchronous motor including a rotor with an embedded permanent magnet. The rotor of the motor generator is mechanically connected to the front wheels that are driving wheels via a power transmission gear, which are not shown. Fr_PCU 30 includes, for example, an inverter for driving the motor generator and a converter that boosts a DC voltage supplied to the inverter to be not less than an output voltage of main battery 11.

When vehicle 1 further includes Rr_PCU 31, Rr_PCU 31 supplies AC power to a motor generator (not shown) with a rotor mechanically connected to the rear wheels via a power transmission gear.

CHRs 14, 15 are electrically connected between main battery 11 and power lines APL1, ANL1, respectively. CHR 14 has one end electrically connected to the positive terminal of main battery 11 and the other end electrically connected to power line APL1. CHR 15 has one end electrically connected to the negative terminal of main battery 11 and the other end electrically connected to power line ANL1. CHRs 14, 15 switch between open/close states, for example, in accordance with a control signal from higher-level ECU 100.

Power lines APL1, ANL1 electrically connect CHRs 14, 15 to an AC charger 22 (not shown) included in power supply unit 20. When vehicle 1 further includes a solar charger 90, solar charger 90 is electrically connected to power lines APL1, ANL1. Solar charger 90 converts electric power generated by a vehicle-mounted solar panel (not shown) into charging power of main battery 11 and supplies the charging power to power lines APL1, ANL1. When CHRs 14, 15 are closed, main battery 11 is charged with the electric power from solar charger 90.

Power supply unit 20 accommodates a plurality of vehicle-mounted devices in a housing and is unitized. Specifically, power supply unit 20 includes a main DC/DC converter 21, AC charger 22, a DC relay 25, a charging integration ECU 26, and a housing 28. Housing 28 has a plurality of tiers and accommodates main DC/DC converter 21, AC charger 22, DC relay 25, and charging integration ECU 26. Fused connectors 87 to 89 are provided on a lateral surface of housing 28. The arrangement of the vehicle-mounted devices in housing 28 will be described below.

Main DC/DC converter 21 is electrically connected between power lines PL, NL and power line EL. Main DC/DC converter 21 is electrically connected to power lines PL, NL via a fuse 86. Main DC/DC converter 21 performs voltage conversion of electric power supplied from main battery 11 to power lines PL, NL and supplies the resultant electric power to power line EL. Main DC/DC converter 21 has a power capacity (the capacity to supply a current to power line EL) higher than the power capacity of a sub-DC/DC converter 24, which will be described below. Main DC/DC converter 21 corresponds to an example of the "first power converter" according to the present disclosure.

Power line EL is electrically connected with low-voltage auxiliary device 40 and an auxiliary battery (not shown). Low-voltage auxiliary device 40 is a device that operates with electric power supplied to power line EL. Low-voltage auxiliary device 40 includes, for example, various ECUs, a lighting device, an audio device, a navigation device, a power steering device, and the like.

Power lines PL, NL are electrically connected with high-voltage auxiliary device 50 via a connector provided on a lateral surface of housing 28 of power supply unit 20. High-voltage auxiliary device 50 includes a water heater 51 and an air conditioner 52.

Water heater 51 is electrically connected to connector 87. Connector 87 is electrically connected to power lines PL, NL in housing 28 of power supply unit 20. Water heater 51 is a heater for heating the vehicle interior. Water heater 51 is formed of, for example, a PTC (Positive Temperature Coefficient) heater. Water heater 51 has, for example, a pipe and heats the water circulating inside the pipe to indirectly heat the air.

Air conditioner 52 is electrically connected to connector 88. Connector 88 is electrically connected to power lines PL, NL in housing 28 of power supply unit 20. Air conditioner 52 includes a compressor and operates the compressor in accordance with a control signal from higher-level ECU 100 to perform air conditioning of the vehicle interior.

High-voltage auxiliary device 50 may further include an AC-100-V inverter 53 that supplies electric power to an in-vehicle outlet (not shown) provided inside vehicle 1. AC-100-V inverter 53 is electrically connected to connector 89. Connector 89 is electrically connected to power lines PL, NL in housing 28 of power supply unit 20. AC-100-V inverter 53 converts electric power of main battery 11 supplied to power lines PL, NL into electric power (e.g., electric power of AC 100 V) to be supplied to the in-vehicle outlet and outputs the converted electric power to the in-vehicle outlet.

AC charger 22 is electrically connected to battery pack 10 by power lines APL1, ANL1. AC charger 22 is also electrically connected to AC inlet 60 by power lines APL2, ANL2.

AC inlet 60 receives AC power supplied from an AC charging station (not shown) external to vehicle 1. AC inlet 60 is connectable with a charging connector provided at a tip of a charging cable of the AC charging station. The AC power received by AC inlet 60 is supplied to AC charger 22 through power lines APL2, ANL2.

AC charger 22 includes a charging circuit 23 and a sub-DC/DC converter 24. In the present embodiment, charging circuit 23 and sub-DC/DC converter 24 are arranged on different substrates and are electrically connected by power line 27.

Charging circuit 23 includes a filter circuit, a PFC (Power Factor Correction) circuit, a smoothing capacitor, and a high-voltage DC/DC converter, which are not shown. The filter circuit is electrically connected to AC inlet 60 via fuse 84. Fuse 84 is configured to interrupt a current path when a current exceeding its rated current flows. Fuses 85, 86, which will be described below, also have a configuration similar to that of fuse 84. For the rated current, however, fuses are configured differently. The filter circuit removes noise contained in the AC power supplied from AC inlet 60 and outputs the AC power without noise to the PFC circuit. The PFC circuit rectifies and boosts the AC power with noise removed by the filter circuit and outputs the resultant AC power to the smoothing capacitor, and also brings the input current closer to a sine wave, thereby correcting a power factor. The PFC circuit may be various PFC circuits. The PFC circuit may be a rectifier having no power factor correction function. The smoothing capacitor smooths voltage fluctuations in the DC power received from the PFC circuit. The smoothed DC power is supplied to the high-voltage DC/DC converter and sub-DC/DC converter 24. The high-voltage DC/DC converter converts the voltage of the DC power smoothed by the smoothing capacitor into a voltage (e.g., over 200 V) suitable for charging of main battery 11, and then, supplies the voltage to power lines APL1, ANL1. Charging circuit 23 corresponds to an example of the "third power converter" according to the present disclosure.

Sub-DC/DC converter 24 converts the voltage of the DC power smoothed by the smoothing capacitor into a voltage to be supplied to low-voltage auxiliary device 40, and supplies the converted electric power to power line EL. Sub-DC/DC converter 24 has fuse 85 between power line EL and sub-DC/DC converter 24. Sub-DC/DC converter 24 has a power capacity (the capacity to supply a current to power line EL) lower than the power capacity of main DC/DC converter 21. Power consumption of sub-DC/DC converter 24 is smaller than power consumption of main DC/DC converter 21. Sub-DC/DC converter 24 corresponds to an example of the "second power converter" according to the present disclosure.

DC relay 25 is provided between battery pack 10 and DC inlet 70. Specifically, DC relay 25 has one end electrically connected to power lines PL, NL and the other end electrically connected to power lines CPL, CNL. Power lines CPL, CNL electrically connect DC inlet 70 to the other end of DC relay 25, DC relay 25 switches between open/close states in accordance with a control signal from charging integration ECU 26. When DC relay 25 is closed, the electric power supplied from DC inlet 70 can be supplied to battery pack 10.

DC inlet 70 receives DC power supplied from a DC charging station (not shown) external to vehicle 1. DC inlet 70 is connectable with a charging connector provided at a tip of a charging cable of the DC charging station. The DC power received by DC inlet 70 is supplied to battery pack 10 through DC relay 25.

Power lines CPL, CNL are provided with a temperature sensor Ts. Temperature sensor Ts detects the temperatures of power lines CPL, CNL and outputs a signal indicating a detection result to charging integration ECU 26 through a temperature detection line.

Charging integration ECU 26 includes a CPU (Central Processing Unit), a memory, and an I/O port, which are not shown. The memory includes a ROM (Read Only Memory) and a RAM (Random Access Memory) and stores a program or the like executed by the CPU. The CPU deploys the program stored in the ROM to the RAM and executes the program. The CPU executes predetermined arithmetic processing based on various signals input from the I/O port and information stored in the memory, and based on the result of the arithmetic processing, controls main DC/DC converter 21, AC charger 22 (charging circuit 23, sub-DC/DC converter 24), and DC relay 25. Such control can be processed not only by software, but also by purpose-built hardware (electronic circuit).

Higher-level ECU 100 is, for example, an EV-ECU. Higher-level ECU 100 includes a CPU, a memory, and an I/O port, which are not shown. The memory includes a ROM and a RANI and stores a program or the like executed by the CPU. The CPU deploys the program stored in the ROM to the RAM and executes the program. The CPU performs predetermined arithmetic processing based on various signals input from the I/O port and information stored in the memory, and based on the result of the arithmetic processing, controls each device such that vehicle 1 enters a desired state. The CPU controls, for example, Fr_PCU 30, Rr_PCU 31, SMRs 12, 13, CHRs 14, 15, low-voltage auxiliary device 40, high-voltage auxiliary device 50, and solar charger 90. Such control can be processed not only by software, but also by purpose-built hardware (electronic circuit).

Higher-level ECU 100 and charging integration ECU 26 are configured to communicate with each other through a communication line. Charging integration ECU 26 controls main DC/DC converter 21, AC charger 22, and DC relay 25 based on information from higher-level ECU 100.

Vehicle 1 configured as described above includes power supply unit 20 in which a plurality of vehicle-mounted devices (main DC/DC converter 21, AC charger 22, DC relay 25, and charging integration ECU 26) are accommodated in housing 28, as described above. The functions of the plurality of vehicle-mounted devices are integrated into a unit, and accordingly, can save more space and have a lower cost than when the plurality of vehicle-mounted devices are arranged individually.

When the functions are to be integrated into a unit, however, the plurality of vehicle-mounted devices are accommodated in the same housing 28, and accordingly, a problem associated with the heat generated in each vehicle-mounted device may become significant. In particular, main DC/DC converter 21, charging circuit 23, and sub-DC/DC converter 24 may generate a large amount of heat in operation. When such devices are arranged adjacent to each other, thus, the risk of failure may increase due to thermal interference between the devices. It is conceivable that main DC/DC converter 21, charging circuit 23, and sub-DC/DC converter 24 may be arranged in different tiers of housing 28. Considering the ease of mounting of power supply unit 20 on vehicle 1, however, there is a demand for preventing an increase in the height of power supply unit 20 (the height of the vehicle in the height direction). Also, each of main DC/DC converter 21, charging circuit 23, and sub-DC/DC converter 24 has a large number of components and includes a large-mass magnetic component, leading to a mass heavier than that of any other vehicle-mounted device. Thus, there is also a demand for arranging main DC/DC converter 21, charging circuit 23, and sub-DC/DC converter 24 in the lowest possible tiers such that the center of gravity of power supply unit 20 is located on the lower side of housing 28.

In the present embodiment, thus, main DC/DC converter 21, charging circuit 23, and sub-DC/DC converter 24 are arranged in the tiers on the lower side of housing 28. Then, main DC/DC converter 21 and sub-DC/DC converter 24 are arranged in the same tier in housing 28. Charging circuit 23 is then arranged in a tier different from that of main DC/DC converter 21 and sub-DC/DC converter 24. Charging integration ECU 26 operates main DC/DC converter 21 and sub-DC/DC converter 24 in a mutually exclusive manner. In other words, charging integration ECU 26 does not operate one of main DC/DC converter 21 and sub-DC/DC converter 24 when operating the other, and does not operate main DC/DC converter 21 and sub-DC/DC converter 24 simultaneously. Accordingly, the amount of heat generated from main DC/DC converter 21 and sub-DC/DC converter 24 can be reduced more than when main DC/DC converter 21 and sub-DC/DC converter 24 are operated simultaneously. This can reduce thermal interference between main DC/DC converter 21 and sub-DC/DC converter 24 while they are arranged in the same tier of housing 28.

Charging circuit 23 is arranged in a tier different from that of main DC/DC converter 21 and sub-DC/DC converter 24 because charging circuit 23 may be required to operate simultaneously with main DC/DC converter 21 and sub-DC/DC converter 24. Specific control of each of during traveling of vehicle 1, during AC charging, and during DC charging will be described below.

Control During Traveling of Vehicle

Figure 2:
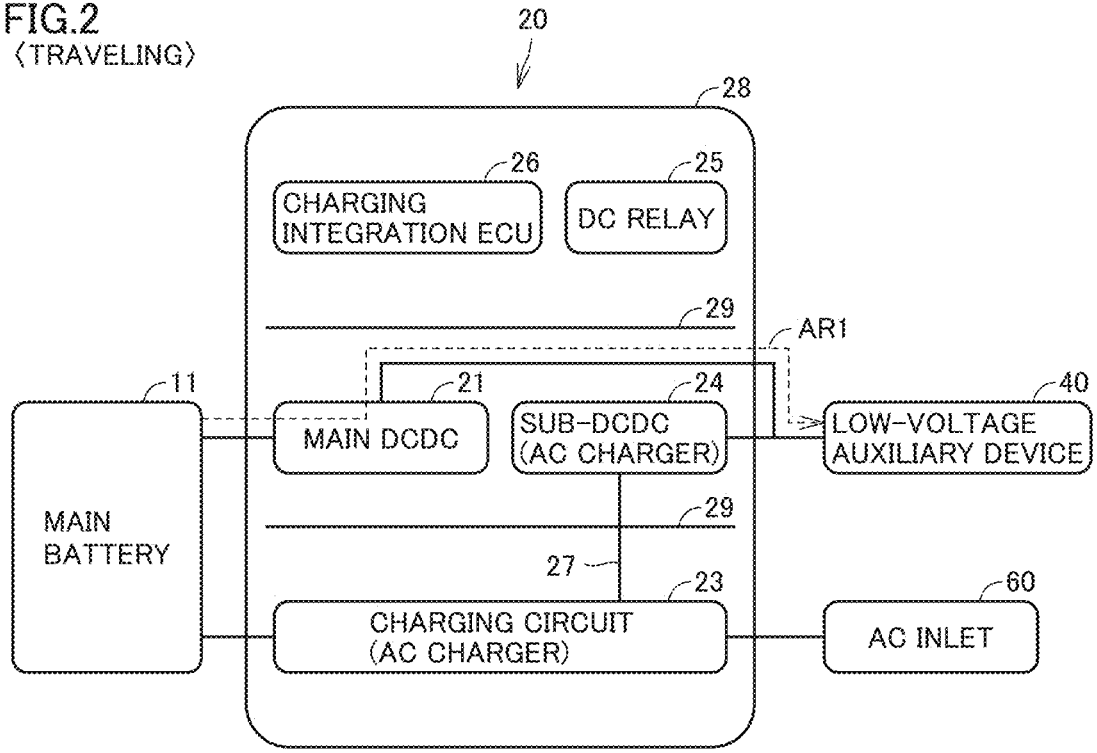
FIG. 2 is a diagram for illustrating control of a power supply unit during traveling of a vehicle.

FIG. 2 is a diagram for illustrating control of power supply unit 20 during traveling of vehicle 1. FIGS. 2 and FIGS. 3 to 5, which will be described below, schematically show main battery 11, power supply unit 20, low-voltage auxiliary device 40, and AC inlet 60.

Housing 28 of power supply unit 20 is made of, for example, aluminum or the like. A plurality of tiers are defined by partition walls 29 in housing 28. Specifically, when power supply unit 20 is mounted on vehicle 1, partition walls 29 extending in the front-rear direction of vehicle 1 are provided, and a plurality of tiers are defined by partition walls 29. In other words, the plurality of tiers are formed to be stacked in the height direction of vehicle 1 in mounting of power supply unit 20 on vehicle 1. In the present embodiment, housing 28 has three tiers. The lowermost tier is also referred to as "first tier", the intermediate tier is also referred to as "second tier", and the uppermost tier is also referred to as "third tier". The "tier" in the present embodiment corresponds to an example of the "accommodation space" according to the present disclosure.

Partition wall 29 has a refrigerant passage through which refrigerant flows. Since partition wall 29 has the refrigerant passage, each vehicle-mounted device accommodated in housing 28 can be cooled. Partition wall 29 may have a heat-insulating material in place of the refrigerant passage. Since partition wall 29 has the heat-insulating material, thermal interference between the vehicle-mounted devices across the tiers can be reduced.

In the present embodiment, charging circuit 23 is arranged in the first tier. Main DC/DC converter 21 and sub-DC/DC converter 24 are arranged in the second tier. DC relay 25 and charging integration ECU 26 are arranged in the third tier. Although charging circuit 23 and sub-DC/DC converter 24 are included in AC charger 22, charging circuit 23 and sub-DC/DC converter 24 can be arranged in different tiers by arranging charging circuit 23 and sub-DC/DC converter 24 on different substrates, as described above.

During traveling of vehicle 1, charging integration ECU 26 stops AC charger 22 (charging circuit 23 and sub-DC/DC converter 24). Charging integration ECU 26 operates main DC/DC converter 21 to convert electric power of main battery 11, and supplies the converted electric power to low-voltage auxiliary device 40 (power line EL), as indicated by an arrow AR1. During traveling of vehicle 1, main DC/DC converter 21 and sub-DC/DC converter 24 are not operated simultaneously, thus avoiding a problem of the amount of heat generation which is associated with the simultaneous operation of main DC/DC converter 21 and sub-DC/DC converter 24.

Control During AC Charging

Figure 3:
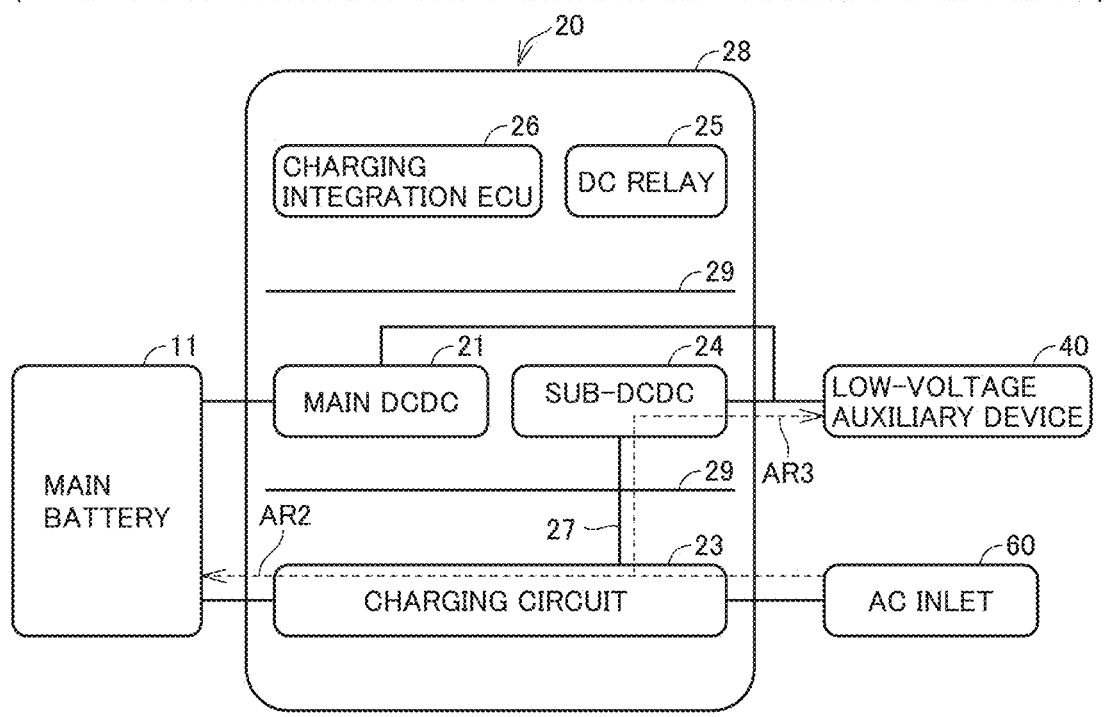
FIG. 3 is a diagram for illustrating control of the power supply unit during AC charging.
Figure 4:
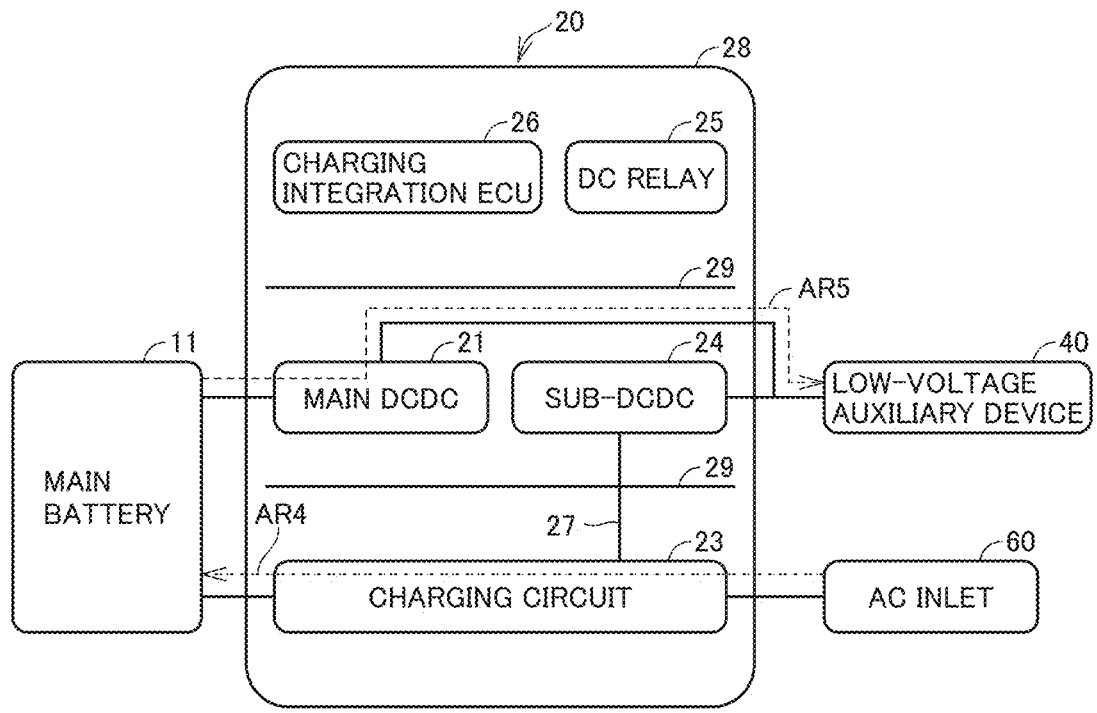
FIG. 4 is a diagram for illustrating control of the power supply unit during AC charging.

FIGS. 3 and 4 are diagrams for illustrating control of power supply unit 20 during AC charging. In the present embodiment, charging integration ECU 26 switches control depending on electric power required by low-voltage auxiliary device 40 (i.e., power consumption of low-voltage auxiliary device 40) which is required during AC charging. FIG. 3 shows a flow of electric power supply to low-voltage auxiliary device 40 when power consumption Pa of low-voltage auxiliary device 40 is less than a threshold Pth. FIG. 4 shows a flow of electric power supply to low-voltage auxiliary device 40 when power consumption Pa of low-voltage auxiliary device 40 is not less than threshold Pth. Threshold Pth is a value determined based on the power capacity of sub-DC/DC converter 24 (the capacity to supply electric power to power line EL). Threshold Pth can be set as appropriate within the range below the power capacity of sub-DC/DC converter 24.

When power consumption Pa of low-voltage auxiliary device 40 is less than threshold Pth, charging integration ECU 26 stops main DC/DC converter 21 and operates sub-DC/DC converter 24 to supply electric power supplied from AC inlet 60 to low-voltage auxiliary device 40. Charging integration ECU 26 divides electric power supplied from AC inlet 60 into electric power to be supplied to main battery 11 and electric power to be supplied to low-voltage auxiliary device 40 (power line EL). Specifically, charging integration ECU 26 operates charging circuit 23 to convert electric power supplied from AC inlet 60 into charging power of main battery 11, and supplies the converted electric power to main battery 11 (arrow AR2). Charging integration ECU 26 also operates charging circuit 23 and sub-DC/DC converter 24 to convert electric power supplied from AC inlet 60 into electric power to be supplied to low-voltage auxiliary device 40, and supplies the converted electric power to low-voltage auxiliary device 40 (arrow AR3).

When power consumption Pa of low-voltage auxiliary device 40 is not less than threshold Pth, charging integration ECU 26 stops sub-DC/DC converter 24 and operates main DC/DC converter 21, and supplies electric power of main battery 11 to low-voltage auxiliary device 40. Charging integration ECU 26 operates charging circuit 23 to convert the electric power supplied from AC inlet 60 into charging power of main battery 11, and supplies the converted electric power to main battery 11 (arrow AR4). Charging integration ECU 26 also operates main DC/DC converter 21 to convert electric power of main battery 11 into electric power to be supplied to low-voltage auxiliary device 40, and supplies the converted electric power to low-voltage auxiliary device 40 (arrow AR5).

When power consumption Pa of low-voltage auxiliary device 40 is less than threshold Pth, charging integration ECU 26 does not operate main DC/DC converter 21 while operating sub-DC/DC converter 24, as described above. When power consumption Pa of low-voltage auxiliary device 40 is not less than threshold Pth, charging integration ECU 26 does not operate sub-DC/DC converter 24 while operating main DC/DC converter 21. In this manner, main DC/DC converter 21 and sub-DC/DC converter 24 are not operated simultaneously, thus avoiding a problem of the amount of heat generation which is associated with the simultaneous operation of main DC/DC converter 21 and sub-DC/DC converter 24.

Power consumption of sub-DC/DC converter 24 is smaller than power consumption of main DC/DC converter 21. Thus, when power consumption Pa of low-voltage auxiliary device 40 is less than threshold Pth, that is, when the amount of electric power supplied from sub-DC/DC converter 24 can cover power consumption Pa of low-voltage auxiliary device 40, a decrease in the charging efficiency of main battery 11 can be reduced while supplying electric power to low-voltage auxiliary device 40 (power line EL) by stopping main DC/DC converter 21 and operating sub-DC/DC converter 24.

Control During DC Charging

Figure 5:
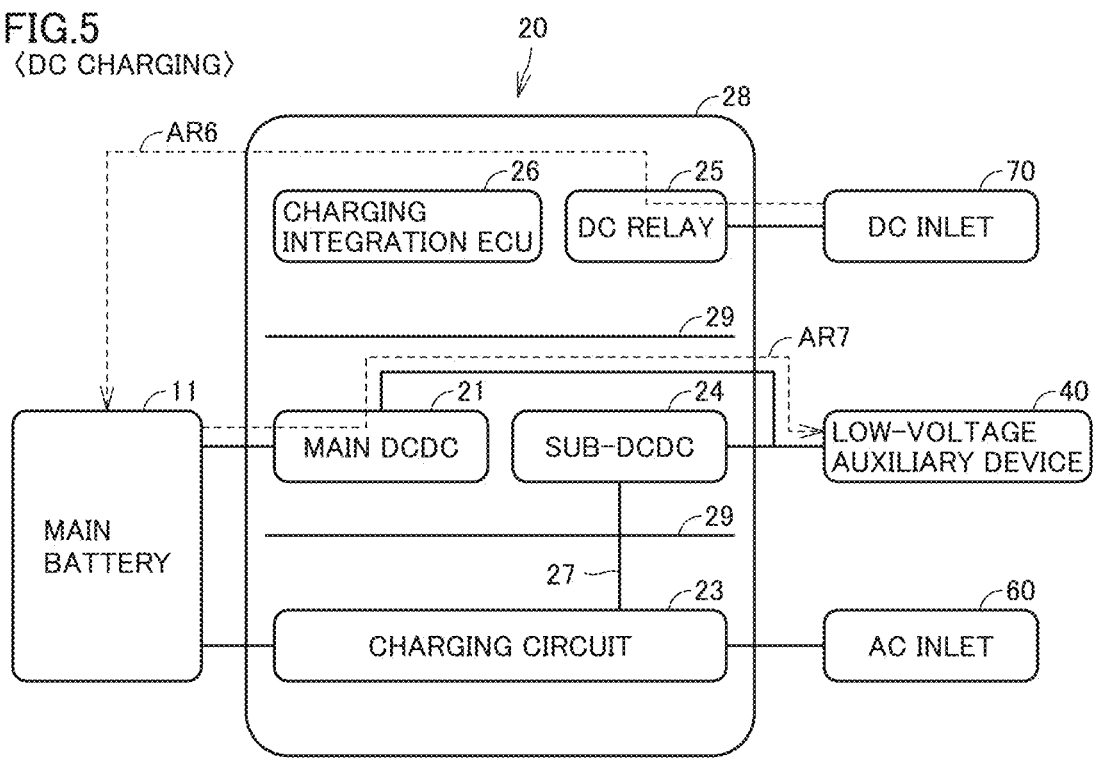
FIG. 5 is a diagram for illustrating control of the power supply unit during DC charging.

FIG. 5 is a diagram for illustrating control of power supply unit 20 during DC charging.

During DC charging, charging integration ECU 26 stops AC charger 22 (charging circuit 23 and sub-DC/DC converter 24). During DC charging, charging integration ECU 26 closes DC relay 25. Thus, the electric power supplied from DC inlet 70 is supplied to main battery 11 through DC relay 25 (arrow AR6). Charging integration ECU 26 also operates main DC/DC converter 21 to convert the electric power of main battery 11 into electric power to be supplied to low-voltage auxiliary device 40, and supplies the converted electric power to low-voltage auxiliary device 40 (arrow AR7). During DC charging, main DC/DC converter 21 and sub-DC/DC converter 24 are not operated simultaneously, thus avoiding a problem of the amount of heat generation which is associated with the simultaneous operation of main DC/DC converter 21 and sub-DC/DC converter 24.

Process Performed by Charging Integration ECU

Figure 6:
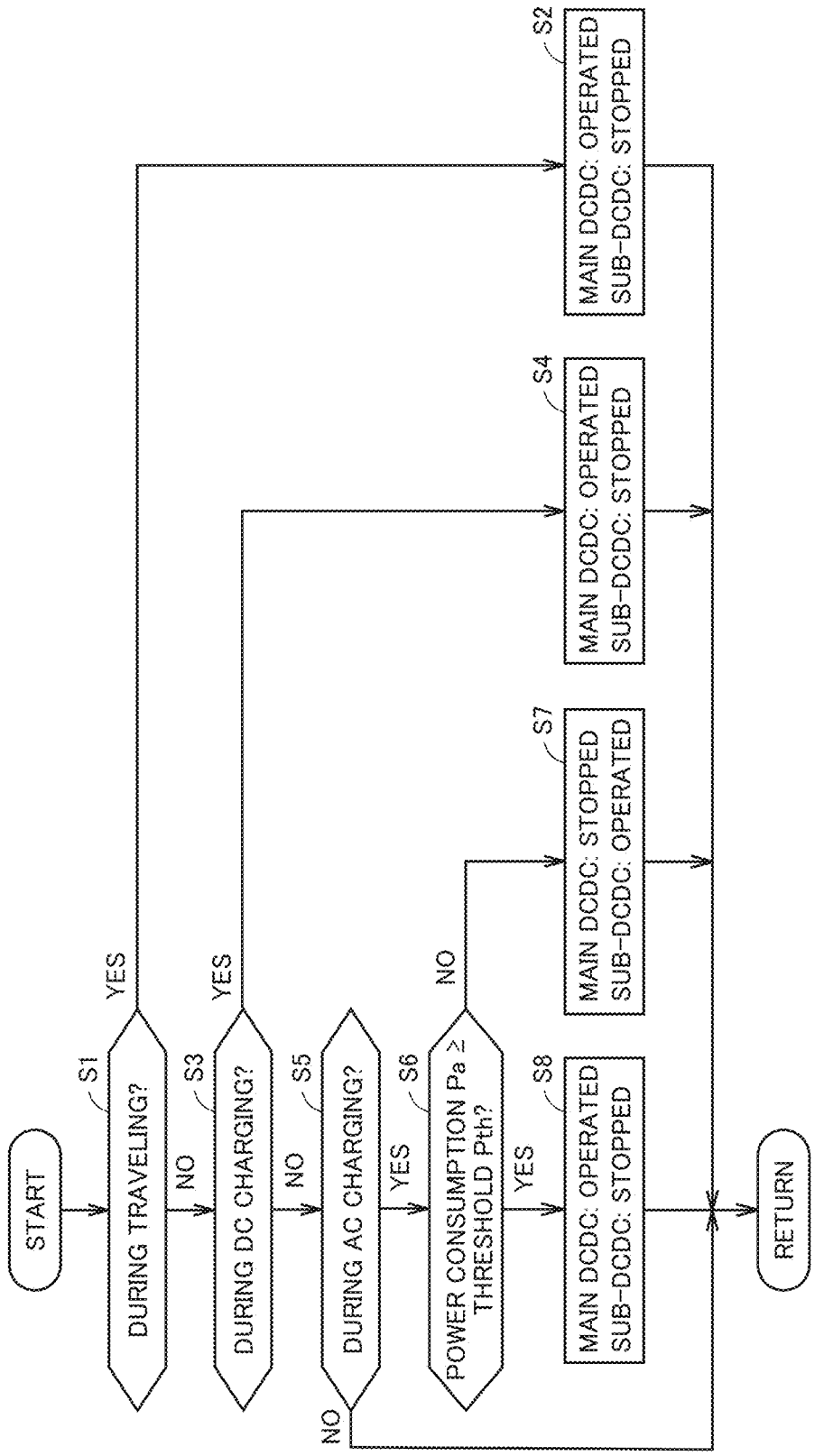
FIG. 6 is a flowchart showing a procedure of control of the power supply unit.

FIG. 6 is a flowchart showing the procedure of control of power supply unit 20. The process shown in the flowchart of FIG. 6 is repeatedly performed by charging integration ECU 26 for each control cycle. Although description will be given of the case where each step (the step is abbreviated as "S" below) of the flowchart shown in FIG. 6 is implemented through software processing by charging integration ECU 26, the step may be partially or entirely implemented by hardware (electronic circuit) formed in charging integration ECU 26.

At S1, charging integration ECU 26 determines whether vehicle 1 is traveling. For example, charging integration ECU 26 may determine whether vehicle 1 is traveling based on information received from higher-level ECU 100. When determining that vehicle 1 is traveling (YES at S1), charging integration ECU 26 moves the process to S2. When determining that vehicle 1 is not traveling (NO at S1), charging integration ECU 26 moves the process to S3.

At S2, charging integration ECU 26 operates main DC/DC converter 21 and stops sub-DC/DC converter 24. By operating main DC/DC converter 21, charging integration ECU 26 converts electric power of main battery 11 into electric power to be supplied to low-voltage auxiliary device 40 and supplies the converted electric power to low-voltage auxiliary device 40 (power line EL).

At S3, charging integration ECU 26 determines whether DC charging is being performed. For example, charging integration ECU 26 determines whether DC charging is being performed, based on the presence or absence of connection of the charging connector to DC inlet 70. When determining that DC charging is being performed (YES at D3), charging integration ECU 26 moves the process to S4. Determining that DC charging is not being performed (NO at S3), charging integration ECU 26 moves the process to S5.

At S4, charging integration ECU 26 operates main DC/DC converter 21 and stops sub-DC/DC converter 24. Charging integration ECU 26 operates main DC/DC converter 21 to convert electric power of main battery 11 into electric power to be supplied to low-voltage auxiliary device 40, and supplies the converted electric power to low-voltage auxiliary device 40 (power line EL). Charging integration ECU 26 keeps DC relay 25 closed. In start of DC charging, charging integration ECU 26 switches DC relay 25 from the open state to the close state.

At S5, charging integration ECU 26 determines whether AC charging is being performed. For example, charging integration ECU 26 determines whether AC charging is being performed, based on the presence or absence of connection of the charging connector to AC inlet 60. When determining that AC charging is being performed (YES at S5), charging integration ECU 26 moves the process to S6. When determining that AC charging is not being performed (NO at S5), charging integration ECU 26 moves the process to RETURN.

At S6, charging integration ECU 26 determines whether power consumption Pa of low-voltage auxiliary device 40 is not less than threshold Pth. When power consumption Pa is less than threshold Pth (NO at S6), charging integration ECU 26 moves the process to S7. When power consumption Pa is not less than threshold Pth (YES at S6), charging integration ECU 26 moves the process to S8.

At S7, charging integration ECU 26 stops main DC/DC converter 21 and operates sub-DC/DC converter 24. During AC charging, charging integration ECU 26 also operates charging circuit 23. By operating charging circuit 23 and sub-DC/DC converter 24, charging integration ECU 26 converts electric power supplied from AC inlet 60 into electric power to be supplied to low-voltage auxiliary device 40, and supplies the converted electric power to low-voltage auxiliary device 40 (power line EL).

At S8, charging integration ECU 26 operates main DC/DC converter 21 and stops sub-DC/DC converter 24. During AC charging, charging integration ECU 26 also operates charging circuit 23. By operating charging circuit 23, charging integration ECU 26 converts electric power supplied from AC inlet 60 into electric power for charging main battery 11, and supplies the converted electric power to main battery 11. By operating main DC/DC converter 21, charging integration ECU 26 converts electric power of main battery 11 into electric power to be supplied to low-voltage auxiliary device 40, and supplies the converted electric power to low-voltage auxiliary device 40 (power line EL).

FIG. 7 shows the operation states of main DC/DC converter 21, charging circuit 23, and sub-DC/DC converter 24. FIG. 7 shows the operation states of main DC/DC converter 21, charging circuit 23, and sub-DC/DC converter 24 during traveling of vehicle 1, during AC charging, and during DC charging.

During traveling of vehicle 1, charging circuit 23 and sub-DC/DC converter 24 are stopped (not operated) and main DC/DC converter 21 is operated.

During AC charging, the operation states of main DC/DC converter 21, charging circuit 23, and sub-DC/DC converter 24 are varied depending on the relation between power consumption Pa of low-voltage auxiliary device 40 and threshold Pth. When power consumption Pa of low-voltage auxiliary device 40 is less than threshold Pth, charging circuit 23 and sub-DC/DC converter 24 are operated, and main DC/DC converter 21 is stopped. When power consumption Pa of low-voltage auxiliary device 40 is not less than threshold Pth, charging circuit 23 and main DC/DC converter 21 are operated, and sub-DC/DC converter 24 is stopped.

During DC charging, charging circuit 23 and sub-DC/DC converter 24 are stopped, and main DC/DC converter 21 is operated.

As described above, power supply unit 20 mounted on vehicle 1 according to the present embodiment includes a plurality of vehicle-mounted devices, specifically, main DC/DC converter 21, AC charger 22, DC relay 25, and charging integration ECU 26, in housing 28, and the functions of the vehicle-mounted devices are integrated. The functions of the vehicle-mounted devices are integrated into a unit, and accordingly, space and cost can be reduced more than when the vehicle-mounted devices are arranged individually.

AC charger 22 includes charging circuit 23 and sub-DC/DC converter 24, which are arranged on different substrates. Charging circuit 23 is electrically connected to sub-DC/DC converter 24 by power line 27. Charging circuit 23 and sub-DC/DC converter 24 can be operated simultaneously, for example, in AC charging. Charging circuit 23 and sub-DC/DC converter 24 are arranged on different substrates, and accordingly, charging circuit 23 and sub-DC/DC converter 24 can be arranged in different tiers of housing 28. This can avoid thermal interference due to the simultaneous operation of charging circuit 23 and sub-DC/DC converter 24, which are arranged in the same tier.

Main DC/DC converter 21 and sub-DC/DC converter 24 are arranged in the same tier of housing 28. Main DC/DC converter 21 and sub-DC/DC converter 24 are operated in a mutually exclusive manner. In other words, charging integration ECU 26 does not operate main DC/DC converter 21 and sub-DC/DC converter 24 simultaneously. Accordingly, the amount of heat generated from main DC/DC converter 21 and sub-DC/DC converter 24 can be reduced more than when main DC/DC converter 21 and sub-DC/DC converter 24 are operated simultaneously.

An increase in the height of power supply unit 20 can be reduced more by arranging main DC/DC converter 21 and sub-DC/DC converter 24 that can be operated in a mutually exclusive manner in the same tier of housing 28 than by arranging main DC/DC converter 21 and sub-DC/DC converter 24 in different tiers. This can increase ease of mounting of vehicle 1 on power supply unit 20.

Charging circuit 23 is arranged in a tier different from that of main DC/DC converter 21 and sub-DC/DC converter 24. Charging circuit 23 may need to be operated simultaneously with main DC/DC converter 21 and sub-DC/DC converter 24. Thus, arranging charging circuit 23 in a tier different from that of main DC/DC converter 21 and sub-DC/DC converter 24 can reduce thermal interference due to the simultaneous operation.

DC relay 25 and charging integration ECU 26 are arranged in a tier different from those of main DC/DC converter 21, charging circuit 23, and sub-DC/DC converter 24 that generate a large amount of heat in operation. This can reduce thermal interference with DC relay 25 and charging integration ECU 26 by main DC/DC converter 21, charging circuit 23, and sub-DC/DC converter 24.

VARIATIONS

Description has been given of the example in which a plurality of tiers are defined by partition walls 29 in housing 28. The plurality of tiers are formed to be stacked in the height direction of vehicle 1 when power supply unit 20 is mounted on vehicle 1. However, it suffices that a plurality of accommodation spaces for accommodating the vehicle-mounted devices can be defined by partition walls 29, and how to define the accommodation spaces is not limited to the formation in which the accommodation spaces are stacked in the height direction of vehicle 1.

For example, a plurality of accommodation spaces may be defined by providing partition walls 29 extending in the height direction of vehicle 1 in mounting of power supply unit 20 on vehicle 1. Also, in mounting of power supply unit 20 on vehicle 1, partition wall 29 extending in the front-rear direction of vehicle 1 and partition wall 29 extending in the height direction of vehicle 1 may be provided together to define a plurality of accommodation spaces.

Also in the above case, main DC/DC converter 21 and sub-DC/DC converter 24 arranged in the same accommodation space can be operated in a mutually exclusive manner, thus achieving effects similar to those of the embodiment.

Although the present disclosure has been described and illustrated in detail, it is clearly understood that the same is by way of illustration and example only and is not to be taken by way of limitation, the scope of the disclosure being interpreted by the terms of the appended claims.

What is claimed is:

1. A power supply unit, comprising:
a first power converter;
a second power converter;
a controller that controls the first power converter and the second power converter; and
a housing that has a plurality of accommodation spaces defined by a partition wall, the housing accommodating the first power converter, the second power converter, and the controller, wherein
the first power converter and the second power converter are arranged in a same accommodation space of the housing,
the controller operates the first power converter and the second power converter in a mutually exclusive manner,
the power supply unit is mounted on a vehicle configured to perform AC charging of charging a main battery mounted on the vehicle with AC power supplied from an AC power supply external to the vehicle,
the first power converter converts electric power of the main battery into electric power to be supplied to an auxiliary device mounted on the vehicle,
the second power converter converts electric power supplied from the AC power supply into electric power to be supplied to the auxiliary device,
the power supply unit further comprises a third power converter that converts the AC power into electric power for charging the main battery,
the third power converter is arranged in an accommodation space different from that of the first power converter and the second power converter,
the controller controls the third power converter,
the second power converter has a power capacity lower than a power capacity of the first power converter, and
in execution of the AC charging, when power consumption of the auxiliary device is smaller than a threshold, the controller operates the third power converter to charge the main battery, operates the second power converter to supply electric power to the auxiliary device, and stops the first power converter.

2. The power supply unit according to claim 1, wherein
in execution of the AC charging, when the power consumption of the auxiliary device is greater than the threshold, the controller operates the third power converter to charge the main battery, operates the first power converter to supply electric power to the auxiliary device, and stops the second power converter.

3. A power supply unit, comprising:
a first power converter;
a second power converter;
a controller that controls the first power converter and the second power converter; and a housing that has a plurality of accommodation spaces defined by a partition wall, the housing accommodating the first power converter, the second power converter, and the controller, wherein the first power converter and the second power converter are arranged in a same accommodation space of the housing, the controller operates the first power converter and the second power converter in a mutually exclusive manner, the power supply unit is mounted on a vehicle configured to perform AC charging of charging a main battery mounted on the vehicle with AC power supplied from an AC power supply external to the vehicle, the first power converter converts electric power of the main battery into electric power to be supplied to an auxiliary device mounted on the vehicle, the second power converter converts electric power supplied from the AC power supply into electric power to be supplied to the auxiliary device, the power supply unit further comprises a third power converter that converts the AC power into electric power for charging the main battery, the third power converter is arranged in an accommodation space different from that of the first power converter and the second power converter, the controller controls the third power converter, the second power converter has a power capacity lower than a power capacity of the first power converter, and in execution of the AC charging, when power consumption of the auxiliary device is greater than a threshold, the controller operates the third power converter to charge the main battery, operates the first power converter to supply electric power to the auxiliary device, and stops the second power converter.

4. A power supply unit, comprising:
a first power converter;
a second power converter;
a controller that controls the first power converter and the second power converter; and a housing that has a plurality of accommodation spaces defined by a partition wall, the housing accommodating the first power converter, the second power converter, and the controller, wherein the first power converter and the second power converter are arranged in a same accommodation space of the housing, the controller operates the first power converter and the second power converter in a mutually exclusive manner, the power supply unit is mounted on a vehicle configured to perform AC charging of charging a main battery mounted on the vehicle with AC power supplied from an AC power supply external to the vehicle, the first power converter converts electric power of the main battery into electric power to be supplied to an auxiliary device mounted on the vehicle, the second power converter converts electric power supplied from the AC power supply into electric power to be supplied to the auxiliary device, the power supply unit further comprises a third power converter that converts the AC power into electric power for charging the main battery, the third power converter is arranged in an accommodation space different from that of the first power converter and the second power converter, the vehicle is configured to perform DC charging of charging the main battery with DC power supplied from a DC power supply external to the vehicle, the power supply unit further comprises a relay for supplying the DC power to the main battery, and the relay is accommodated in an accommodation space different from the accommodation space of the first power converter and the second power converter and the accommodation space of the third power converter.

* * * * *